United States Patent
Luo et al.

(10) Patent No.: US 7,593,135 B2
(45) Date of Patent: Sep. 22, 2009

(54) DIGITAL IMAGE MULTITONING METHOD

(75) Inventors: Jiebo Luo, Pittsford, NY (US); Qing Yu, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1382 days.

(21) Appl. No.: 09/896,798

(22) Filed: Jun. 29, 2001

(65) Prior Publication Data

US 2003/0007184 A1    Jan. 9, 2003

(51) Int. Cl.
*H04N 1/40* (2006.01)
*H04N 1/405* (2006.01)

(52) U.S. Cl. .................... 358/3.21; 358/3.01; 358/3.03

(58) Field of Classification Search ............... 358/3.01, 358/3.21, 3.1, 1.2, 522, 1.9, 3.03, 3.05, 3.12, 358/536; 382/169
See application file for complete search history.

(56) References Cited

U.S. PATENT DOCUMENTS

| | | | |
|---|---|---|---|
| 4,945,478 A * | 7/1990 | Merickel et al. ............ 382/131 |
| 5,565,994 A * | 10/1996 | Eschbach ................... 358/3.03 |
| 5,621,546 A * | 4/1997 | Klassen et al. .............. 358/536 |
| 5,640,249 A | 6/1997 | Rao et al. |
| 5,649,025 A * | 7/1997 | Revankar .................... 382/171 |
| 5,936,684 A * | 8/1999 | Murayama .................. 348/673 |
| 6,501,566 B1 * | 12/2002 | Ishiguro et al. ............. 358/3.05 |

OTHER PUBLICATIONS

Patent Abstracts of Japan, vol. 0133, No. 23 (E-791), Jul. 21, 1989 & JP 1 08966 A (Toshiba Corp), Apr. 4, 1989 Abstract.

Gentile et al., "Quantization and multilevel halftoning of color images for near-original image quality", *Optical Society of America*, vol. 7, No. 6, Jun. 1990, pp. 1019-1026.

Pattern Classification, 2nd Edition, Richard O. Duda, Peter E. Hart, David G. Stork, John Wiley & Sons, Inc., New York, (2001), Chapter 10, pp. 526-528.

"Statistics Toolbox 5.1" for MATLAB® marketed by The MathWorks, Inc., of Natick, Massachusetts. (Described generally in Datasheet [online]. The MathWorks, Inc., of Natick, Massachusetts [retrieved on Sep. 26, 2005]. Retrieved from the Internet at www.mathworks.com/products/statistics/.).

"K-Means :: Functions (Statistics Toolbox)" [online]. The MathWorks, Inc., Natick, Massachusetts [retrieved on Sep. 26, 2005]. Retrieved from the Internet at www.mathworks.com/access/helpdesk/help/toolbox/stats/.

"K-Means Clustering :: Multivariate Statistics (Statistics Toolbox)" [online]. The MathWorks, Inc., Natick, Massachusetts [retrieved on Sep. 26, 2005]. Retrieved from the Internet at www.mathwors.com/access/helpdesk/help/toolbox/stats/.

"K-Means Clustering Algorithm—From MathWorld" [online]. Wolfram Research, Inc., Champaign, Illinois [retrieved on Sep. 26, 2005]. Retrieved from the Internet at //mathworld.wolfram.com/K-meansClusteringAlgorithm.html.

* cited by examiner

*Primary Examiner*—James A Thompson
(74) *Attorney, Agent, or Firm*—Thomas H. Close; Robert L. Walker

(57) ABSTRACT

A method for multitone processing an N level digital image to produce an M level digital image wherein M<N, includes the steps of: determining M reconstruction levels based on the gray level distribution of the N level image; and applying multilevel dithering to the N level digital image using the M reconstruction levels to produce the M level digital image.

10 Claims, 3 Drawing Sheets

DIGITAL IMAGE MULTITONING METHOD

FIELD OF THE INVENTION

The present invention relates generally to a method and system for forming multi-level halftone images from an input digital image, which minimize the perceived noise level in the multitoned image.

BACKGROUND OF THE INVENTION

For the purpose of printing images from a graphical display, such as the display screen of a computer, many such displays are typically only capable of printing binary images. In other words, at each position of the image there are only two possible output states, colorant or no colorant. For example, a traditional graphic arts printing press will either disperse ink or withhold ink at each location of the image. For monochrome imaging systems, this means that an image can only be made up of pixels that are either black or white. To create the illusion of continuous tone images, methods referred to in the art as "halftoning techniques" have been developed. With these techniques, the appearance of intermediate gray levels is created by taking advantage of the fact that the human eye acts as a low-pass filter and will average the intensity over a small local area of the image. It is, therefore, possible to locally vary the ratio between the white area and the black area to form varying levels of gray.

Although, historically, halftone dot patterns were created optically for images made on printing presses, presently the majority of halftone images are created on a computer using one of many presently known and utilized digital halftoning algorithms. Two widely used halftoning algorithms for digital printers, such as laser writers, are generally referred to in the art as periodic dither and error diffusion.

Although halftoning techniques were originally developed for binary output devices, recent developments have made them available for multi-level output devices or, in other words, devices that produce a variety of different colorant levels. (For example see: R. S. Gentile, E. Walowit and J. P. Allebach, "Quantization and multilevel halftoning of color images for near original image quality," J. Opt. Soc. Am. A 7, 1019-1026 (1990)). There are several motivations in the art for performing multi-level halftoning. First, some output devices may only be capable of producing a limited set of output colors. For such displays, noticeable artifacts, such as contouring, will result if simple quantization methods are used to produce the image. Contouring is the visible transitions between adjacent output levels that typically result when many input levels are mapped to a single output level.

Multi-level halftoning methods eliminate contouring artifacts by preserving the original average color level in a local image region. In some cases, the number of output colors of the display device is large enough so that contouring does not occur and, as a result, multi-level halftoning is generally not necessary. Even in such a case, there may be advantages to using multi-level halftoning techniques. For example, it may be possible to reduce the amount of RAM required in a printer or the disk-space required for an image file by reducing the number of bits required to store each image pixel. In this case, multi-level halftoning could be considered to be a form of image compression.

Gentile et al. describe generalizations of both the conventional error-diffusion and dither techniques for use with multi-level image displays. They report a number of variations for each technique related to the form of the quantizer which is used to map the input color values to the quantized output color values. In particular, they describe two image independent quantizers, a "RGB cubical quantizer" and an "L*u*v* uniform quantizer."

The L*u*v* uniform quantizer is implemented by first transforming the input color value to a uniform color space (such as the well-known and standardized CIE-LUW color space) and performing the quantization in that space. The quantized color values must then be transformed to the output color space. An advantage of this method is that the visibility of the halftone patterns will be more uniform across the color space. The primary drawback is that the implementation is much more complex than the simple cubical quantizer due to the fact that transformations into and out of the uniform color space must be calculated for each pixel. These transformations involve either a series of mathematical equations or the use of multi-dimensional look-up tables (LUTs).

Consequently, a need exists for a multi-level halftoning method and apparatus for digital images that are simultaneously simple to compute and which produces halftone patterns having reduced noise.

SUMMARY OF THE INVENTION

The need is met according to the present invention by providing a method for multitone processing an N level digital image to produce an M level digital image wherein M<N, that includes the steps of: determining M reconstruction levels based on the gray level distribution of the N level image; and applying multilevel dithering to the N level digital image using the M reconstruction levels to produce the M level digital image. In a preferred embodiment of the invention, the M reconstruction levels are selected according to a K-means clustering technique and the multilevel dithering is multilevel error diffusion.

Advantages

The present invention has the advantage that, instead of conventionally equally spaced reconstruction levels, adaptive reconstruction levels are determined according to the distribution of image pixel values for a given image, resulting in reduced noise in the multilevel dithered output image.

DETAILED DESCRIPTION OF THE INVENTION

Figure 1:
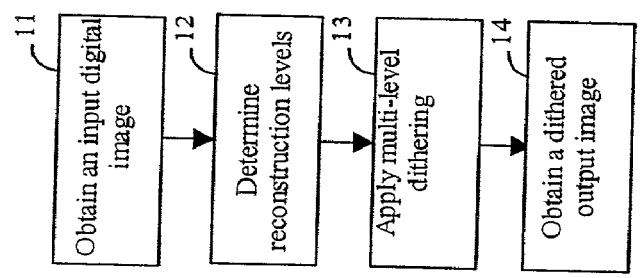
FIG. 1 is a flow chart describing the processing steps of the present invention.

Referring to FIG. 1, there is shown a block diagram of the present invention for a monochrome input digital image. An N level input digital image is obtained 11 and used to determine a set of M image-dependent, optimal reconstruction levels 12, where M<N, based on the gray level distribution of the N level image. In a preferred embodiment of the present invention, these reconstruction levels are chosen to minimize a mean squared error (MSE) between the N level input digital image and an M level output digital image where each pixel is quantized to the nearest reconstruction level.

A K-means clustering technique is used in the preferred embodiment to partition the values present in the N level input image into K clusters, where K is equal to M, giving rise to M cluster means.

Figure 2:
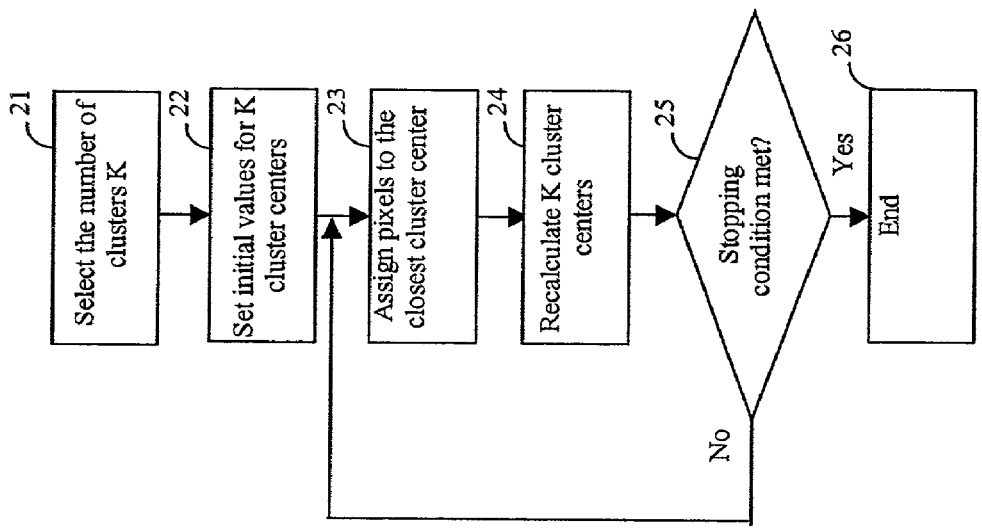
FIG. 2 is a flow chart describing the K-means clustering technique.

Referring to FIG. 2, there is shown the steps of the K-means clustering technique. First, the number of clusters K is selected to be equal to M 21. Then initial values for the K cluster centers are chosen 22 either randomly or uniformly spaced in the range of pixel values of the input digital image. Next, each pixel is assigned 23 to the closest cluster center according to the Euclidean distance, which corresponds to minimization of the mean squared error. Cluster centers are then recalculated 24 using all the pixel values assigned to each cluster center. Next, a pre-determined stopping condition is checked 25. One example of a stopping condition is when the changes in the cluster centers are below a predetermined threshold. If the pre-determined stopping condition is not met, steps 23 and 24 are repeated. Otherwise, the K-means clustering process is stopped 26. For more details about the K-means algorithm, see Tou and Gonzalez, Pattern Recognition Principles, Reading Mass.: Addison-Wesley, 1974. These K cluster means are used as the M optimal reconstruction levels to produce an M level output image. To aid in the clustering process, and to make sure that the dynamic range of the image is optimized, the first and last (highest and lowest) levels of the M levels can be predetermined. For example, the first level can be set to zero, and the last level can be set to the maximum possible level.

Figure 5:
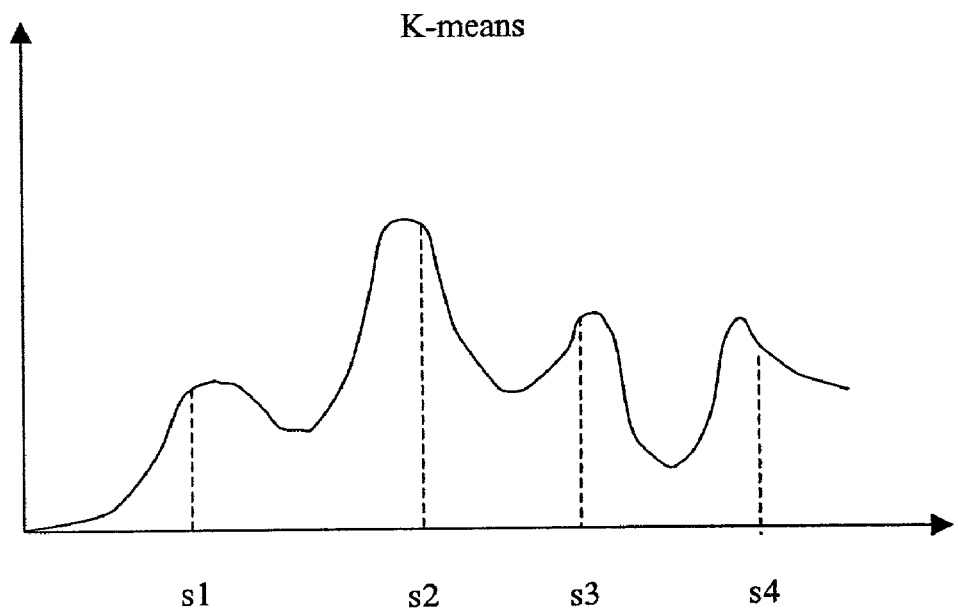
FIG. 5 is a diagram representing a grayscale histogram partitioned into a number of "cluster" distributions.

Referring to FIG. 5, there is shown a typical histogram of intensity values of an N level input image. Using the K-means algorithm, the histogram is partitioned into M clusters of distribution. The centers of these M clusters (e.g., s1, s2, s3, and s4 as shown in FIG. 5) are selected as the reconstruction levels.

Figure 6:
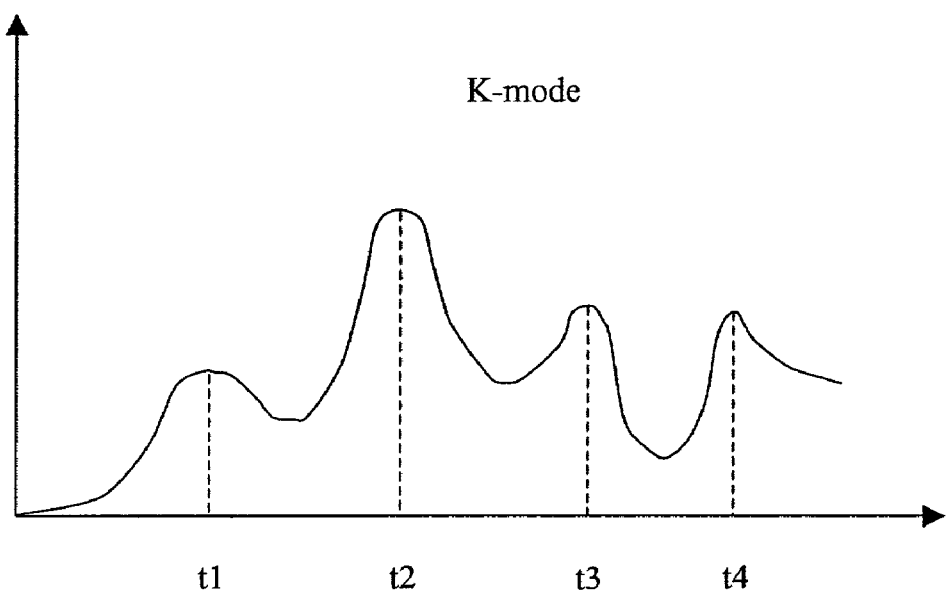
FIG. 6 is a diagram representing a grayscale histogram having a number of "mode" distributions.

Alternatively, the peaks, also referred to as the "modes", can be identified, as shown in FIG. 6. The corresponding values of these "modes" (e.g., t1, t2, t3, and t4 as shown in FIG. 6) can be used as the reconstruction levels.

Referring back to FIG. 1, the M optimal reconstruction levels are then used to apply multi-level dithering 13 to the image to obtain 14 an M level output image. Multi-level dithering can be used to create the appearance of intensity values intermediate to the reconstruction levels by varying the values assigned to the pixels of the output digital image such that the local mean intensity value is preserved. An example of a multi-level halftoning method that could be used would be multi-level error diffusion.

Figure 3:
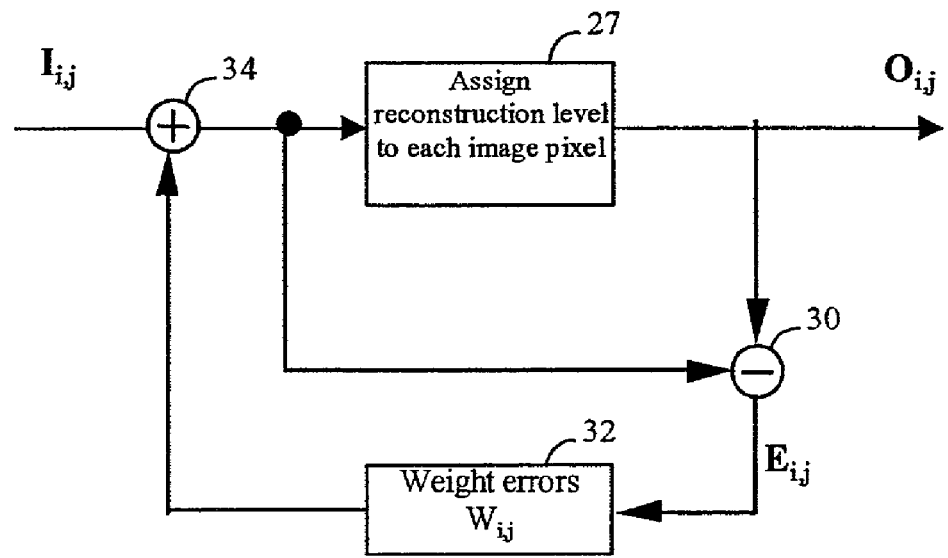
FIG. 3 is a diagram showing a multi-level error diffusion algorithm.

A flow diagram illustrating a typical multi-level error diffusion algorithm is shown in FIG. 3. In this figure, an input pixel value $I_{ij}$ from the $i^{th}$ column and $j^{th}$ row of the input digital color image is processed by assigning 27 a reconstruction level to each image pixel to form a corresponding output pixel value $O_{ij}$ of the output digital image. The assignment of a reconstruction level to each image pixel introduces a quantization error due to the fact that the output pixel value is selected to be one of the reconstruction levels in the determined set reconstruction levels. A difference operation 30 is used to compute an intensity error $E_{ij}$ representing the difference between the input pixel value $I_{ij}$ and the output pixel value $O_{ij}$. A errors $E_{ij}$ are weighted by applying 32 a series of error weights $W_{ij}$ to the resulting intensity error $E_{ij}$. The weighted intensity errors are then added 34 to the nearby input pixels that have yet to be processed.

Figure 4:
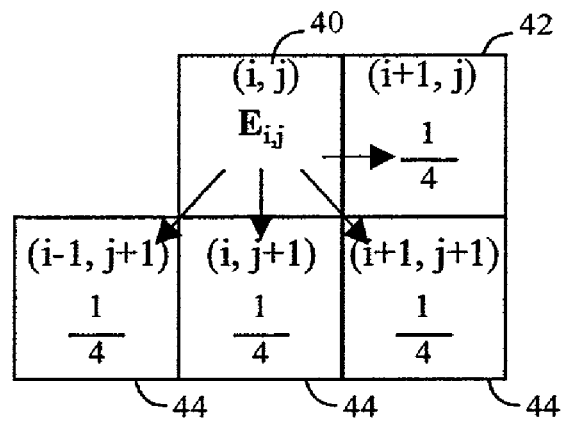
FIG. 4 shows an example set of error weights that can be used for a multi-level error diffusion algorithm.

An example set of error weights $W_{ij}$ is shown in FIG. 4. In this example, the intensity error $E_{ij}$ for the current pixel 40 with column and row address (i, j) is weighted by a factor of ¼ and distributed to the next pixel to the right 42 in the current row of the image having the column and row address (i+1, j). Likewise the intensity error $E_{ij}$ is also weighted by factors of ¼ and distributed to three pixels in the next row of the image 44 having column and row addresses (i−1,j+1), (i,j+1) and (i+1,j+1). In this way, the quantization errors introduced when processing the current pixel 40 are distributed to nearby input pixels that have not yet been processed. The result is that the local mean intensity value is approximately preserved.

Conventionally, image-independent, uniformly spaced reconstruction levels are used in a multi-toning process. For example, 0, 85, 170, and 255 are the fixed reconstruction levels if a 4 level dithering is desired for an input image with 256 intensity levels. According to the present invention, image-dependent reconstruction levels are used. By using image-dependent reconstruction levels, there is a high likelihood that the amount of quantization error will be relatively smaller than would otherwise incurs using fixed reconstruction levels at a given pixel. Therefore, there is a lower likelihood for the need to diffuse quantization error to nearby input pixels. The effect of using image-dependent reconstruction levels is less perceived noise in the final multi-level dithered output images.

Those skilled in the art would recognize that the art taught in the present invention could be extended without departing from the scope of the present teachings. For example, for multi-channel digital images, one straightforward extension is to perform the K-means clustering and multi-level error diffusion on each channel of the multi-channel digital image independently. Alternatively, the K-means clustering can be performed in the multi-channel space followed by a multi-level dithering such as vector error diffusion. For more details of vector error diffusion, see Gentile, supra.

The present invention may be embodied in a computer program product that may include one or more storage media, for example: magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

Parts List

| PARTS LIST |
| --- |
| 11 obtain an input digital image step |
| 12 determine reconstruction levels step |
| 13 apply multi-level dithering step |
| 14 obtain a dithered output image step |
| 21 select the number of clusters step |
| 22 set initial cluster centers step |
| 23 assign pixels step |
| 24 recalculate cluster centers step |
| 25 stopping condition |

-continued

PARTS LIST 26 end K-means step
27 assign reconstruction level to each image pixel step
30 difference operation
32 weight errors step
34 sum operation
40 current pixel
42 next pixel to the right
44 pixels in next row of image

What is claimed is:

1. A method for multitone processing an N level digital image to produce an M level digital image wherein M and N have unchanging values and M<N, comprising the steps of:
   clustering all of the pixel values of the N level image into M reconstruction levels based on the gray level distribution of the N level image, wherein the clustering produces K clusters of pixel values, and wherein K=M;
   repeatedly revising said K clusters of pixel values until error between the N level digital image and the M level digital image is minimized, wherein throughout the repeated revising of said K clusters, the number of clusters K does not change;
   applying multilevel error diffusion to the N level digital image using said M reconstruction levels to produce the M level digital image; and
   applying said M level digital image to an image output device.

2. The method of claim 1 wherein the first and last levels of the M levels are predetermined.

3. The method of claim 1 wherein the N level digital image has multiple channels and K-means clustering and multi-level error diffusion are performed on each of the multiple channels independently.

4. The method claimed in claim 1 wherein the N level digital image has multiple channels and K-means clustering and multi-level error diffusion are performed in multi-channel vector space.

5. A method for multitone processing an N level digital image to produce an M level digital image wherein M and N have unchanging values and M<N, comprising the steps of:
   setting initial values of M cluster centers;
   assigning pixels of the N level digital image to said cluster centers to provide assigned pixels;
   calculating new values of said cluster centers based upon respective said assigned pixels;
   repeating said assigning and calculating until a predetermined stopping condition is reached and, thereby, final values of said cluster centers are defined;
   selecting said final values of said cluster centers as reconstruction levels;
   applying multilevel error diffusion to the N level digital image using said reconstruction levels to produce the M level digital image; and
   applying said M level digital image to an image output device.

6. The method of claim 5 wherein said assigning minimizes respective mean squared error.

7. The method of claim 5 wherein said stopping condition is a predetermined threshold.

8. The method of claim 5 wherein first and last of said reconstruction levels are predetermined.

9. The method of claim 5 wherein the N level digital image has multiple channels and said setting, assigning, calculating, repeating, selecting, and applying steps are performed independently on each of said multiple channels.

10. The method of claim 5 wherein the N level digital image has multiple channels and said setting, assigning, calculating, repeating, selecting, and applying steps are performed in multi-channel vector space.

* * * * *

UNITED STATES PATENT AND TRADEMARK OFFICE
CERTIFICATE OF CORRECTION

| | | |
|---|---|---|
| PATENT NO. | : 7,593,135 B2 | Page 1 of 1 |
| APPLICATION NO. | : 09/896798 | |
| DATED | : September 22, 2009 | |
| INVENTOR(S) | : Jiebo Luo et al. | |

It is certified that error appears in the above-identified patent and that said Letters Patent is hereby corrected as shown below:

Title Page; item (56);

| Issued Patent | | |
|---|---|---|
| Column | Line | Description of Error |
| First Page<br>Column 1<br>(Other Publication) | 3 | Delete "JP 1 08966A" and insert<br>-- JP 1 089666 A --, therefor. |
| First Page<br>Column 2<br>(Other Publication) | 18 | Delete "www.mathwors.com/" and insert<br>-- www.mathworks.com/ --, therefor. |

Signed and Sealed this

Sixteenth Day of February, 2010

David J. Kappos
*Director of the United States Patent and Trademark Office*